US012686562B2

(12) United States Patent
Nie et al.

(10) Patent No.: US 12,686,562 B2
(45) Date of Patent: Jul. 21, 2026

(54) WHOLE-PROCESS AUTOMATIC LOADING-AND-UNLOADING AND LOGISTICS SYSTEM

(71) Applicant: YICHANG JINGWEI TEXTILE MACHINERY CO., LTD., Yichang (CN)

(72) Inventors: Jian Nie, Yichang (CN); Pihua Zhang, Yichang (CN); Ming Zhang, Yichang (CN); Yanwei Zhang, Yichang (CN); Lei Wu, Yichang (CN); Yuchao Yan, Yichang (CN); Yongming Li, Yichang (CN); Longfei Zhang, Yichang (CN); Qingqing Lv, Yichang (CN); Huanian Yang, Yichang (CN)

(73) Assignee: YICHANG JINGWEI TEXTILE MACHINERY CO., LTD. (CN)

( * ) Notice: Subject to any disclaimer, the term of this patent is extended or adjusted under 35 U.S.C. 154(b) by 527 days.

(21) Appl. No.: 18/086,269

(22) Filed: Dec. 21, 2022

(65) Prior Publication Data

US 2024/0124227 A1     Apr. 18, 2024

(30) Foreign Application Priority Data

Oct. 13, 2022     (CN) .......................... 202211251289.5

(51) Int. Cl.
B65G 1/04          (2006.01)
B65G 9/00          (2006.01)
G05B 19/418        (2006.01)

(52) U.S. Cl.
CPC ........... B65G 1/0457 (2013.01); B65G 9/008 (2013.01); G05B 19/41865 (2013.01); B65G 2203/0283 (2013.01); G05B 2219/45192 (2013.01)

(58) Field of Classification Search
CPC .......... B65G 1/0457; D01H 1/18; D01H 1/40; D01H 1/36; D01H 1/166; D01H 1/186; (Continued)

(56) References Cited

U.S. PATENT DOCUMENTS 3,154,909 A * 11/1964 Urano ...................... D01H 9/10
                                                    57/271
3,360,914 A * 1/1968 Black, Jr. ............. D01H 13/005
                                                    57/1 R
(Continued)

FOREIGN PATENT DOCUMENTS

CN          209238230 U      8/2019
CN          110735199 A      1/2020
(Continued)

OTHER PUBLICATIONS

English translation of CN 114000232 obtained via espacenet.com (last visited May 7, 2025). (Year: 2025).*

(Continued)

*Primary Examiner* — Patrick J. Lynch

(57) ABSTRACT

A whole-process automatic loading-and-unloading and logistics system is disclosed. The system includes an outer yarn preparation area, an inner yarn preparation area, a weaving area and an in-air conveying rail; the outer yarn preparation area is configured to have a carrier assembly, which delivers an outer yarn winding package to an outer yarn branch rail of a twisting machine in a twisting area via the out yarn main rail of the in-air conveying rail; in the inner yarn preparation area, the carrier assembly delivers an inner yarn winding package to an inner yarn branch rail of the twisting machine in the twisting area via the inner yarn main rail of the in-air conveying rail; in the twisting area, the carrier assembly delivers a yarn product to a yarn product (Continued)

donning rail in the weaving area via the yarn product main rail of the in-air conveying rail.

16 Claims, 18 Drawing Sheets

(58) Field of Classification Search
CPC .......... D01H 1/10; D01H 1/101; D01H 1/103; D01H 1/105; D01H 1/106; D01H 9/182; D01H 3/08; D01H 3/10; D01H 3/06; D01H 3/18; D01H 13/005
See application file for complete search history.

(56) References Cited

U.S. PATENT DOCUMENTS

| | | | | | |
|---|---|---|---|---|---|
| 3,534,539 | A | * | 10/1970 | Franzen et al. ........ | D01H 9/005 57/276 |
| 3,946,547 | A | * | 3/1976 | Salmoiraghi .......... | D01H 9/182 57/274 |
| 4,856,270 | A | * | 8/1989 | Langen ................ | B65H 67/064 242/473.6 |
| 4,897,992 | A | * | 2/1990 | Kogiso .................... | D01H 9/18 57/281 |
| 4,934,132 | A | * | 6/1990 | Marzoli ................. | D01H 9/046 57/267 |
| 4,979,360 | A | * | 12/1990 | Kallmann ............... | D01H 9/18 57/276 |
| 5,010,725 | A | * | 4/1991 | Yasui ....................... | D01H 9/18 57/90 |
| 5,136,833 | A | * | 8/1992 | Inger ........................ | D01H 9/16 242/476.1 |
| 5,207,051 | A | * | 5/1993 | Inger .................... | B65H 67/064 198/465.1 |
| 5,279,729 | A | * | 1/1994 | Tone ........................ | B07C 5/342 209/927 |
| 5,292,081 | A | * | 3/1994 | Langen ................ | B65G 47/248 242/473.6 |
| 5,301,497 | A | * | 4/1994 | Leupers .................... | D01H 9/18 57/90 |
| 5,373,930 | A | * | 12/1994 | Tsuzuki ............... | B65H 67/064 198/399 |
| 2022/0074084 | A1 | * | 3/2022 | Zhang ..................... | D01H 9/00 |

FOREIGN PATENT DOCUMENTS

| | | | | | |
|---|---|---|---|---|---|
| CN | 210596842 | U | | 5/2020 | |
| CN | 211171010 | U | * | 8/2020 | .............. D01H 1/16 |
| CN | 112011863 | A | * | 12/2020 | |
| CN | 212476995 | U | * | 2/2021 | ........... B25J 9/0093 |
| CN | 112538790 | A | * | 3/2021 | ............... B61L 5/04 |
| CN | 113291929 | A | * | 8/2021 | ............ B65G 35/00 |
| CN | 113684569 | A | * | 11/2021 | |
| CN | 114000232 | A | * | 2/2022 | |
| CN | 217378135 | U | * | 9/2022 | |
| DE | 4222723 | A1 | * | 1/1994 | .......... B65G 47/515 |
| DE | 102020111766 | A1 | * | 11/2021 | |
| EP | 0544976 | A2 | * | 6/1993 | .............. D01H 9/18 |

OTHER PUBLICATIONS

First Notification of Office Action by CNIPA, dated Dec. 27, 2024, whole translation.

* cited by examiner

1

WHOLE-PROCESS AUTOMATIC LOADING-AND-UNLOADING AND LOGISTICS SYSTEM

CROSS-REFERENCE TO RELATED APPLICATION

This application claims priority from the Chinese patent application 202211251289.5 filed Oct. 13, 2022, the content of which is incorporated herein in the entirety by reference.

TECHNICAL FIELD

The present disclosure relates to the technical field of twisting and weaving equipment in factories, in particular to a whole-process automatic loading-and-unloading and logistics system.

BACKGROUND

Existing twisting and weaving factories make donning mainly in manual way, but due to long donning time, low efficiency and big labor intensity arising from their expansion in scale, this way has become an urgent problem for various enterprises. There is a technical solution on robotic donning with AVG (Automatic Guided Vehicle) in the prior art, such as a China patent CN111996627A named an automatic donning for twisting machine, but the donning efficiency provided in this solution is still low; moreover, its control is difficult, and the robot has the weak ability to dodge operators, thus often cause many disruptions to the operator's work. There is also a technical solution on automatic donning and doffing, but this solution still needs to make manual donning after doffing, such as a China patent CN112011863A named an automatic doffing system for twisting production. This technical field demands a solution that can be adopted to don yarn in large scale and improve donning efficiency with fairly low labor intensity of operators.

SUMMARY

The technical problem to be solved by the present disclosure consists in effectuation of large-scale automatization for donning, high automation level, high operation efficiency and low labor intensity of operators, therefor we provide a whole-process automatic loading-and-unloading and logistics system.

In order to solve the above technical problem, the technical scheme adopted in the present disclosure is as follows:

A whole-process automatic loading-and-unloading and logistics system, comprising an outer yarn preparation area, an inner yarn preparation area, a weaving area and an in-air conveying rail;

the outer yarn preparation area is configured to have a carrier assembly, which delivers an outer yarn winding package to an outer yarn branch rail of a twisting machine in a twisting area via an out yarn main rail of the in-air conveying rail;

in the inner yarn preparation area, the carrier assembly delivers an inner yarn winding package to an inner yarn branch rail of the twisting machine in the twisting area via an inner yarn main rail of the in-air conveying rail.

In a preferred embodiment, in the twisting area, the carrier assembly delivers a yarn product to a yarn product donning rail in the weaving area via a yarn product main rail of the in-air conveying rail.

In a preferred embodiment, the carrier assembly is formed by articulating and connecting a plurality of independent units, the number of the independent units of the carrier assembly corresponds to the number of the operation stations of the twisting machine in the twisting area;

the carrier assembly is driven to travel by a travel driving unit fixed on the in-air conveying rail;

In a preferred embodiment, a carrier-backing rail is further arranged on the in-air conveying rail, and has its one end connected to the in-air conveying rail and its other blind end.

In a preferred embodiment, a yarn product buffering rail, which is a parallel multi-row rail, is further arranged on the in-air conveying rail, and has its both ends connected to a yarn product main rail.

In a preferred embodiment, diverging-and-merging switches are arranged at many positions of the in-air conveying rail, enabling a controllable reversal between two rails.

In a preferred embodiment, the in-air conveying vail is provided with an inner cavity, in which a movement part of the carrier assembly runs;

the diverging-and-merging switch is structured in the relation that a switch pin shaft is vertically arranged at the position where a switch case of the diverging-and-merging switch forks, and a vertical rail-change baffle is connected to the switch pin shaft and capable of swaying, the rail-change baffle has its one end positioned in the cavity of the switch case, and its free end extending from two rails to one nil and capable of covering either of the two rails;

the rail-change baffle is further connected with a switch power-driven rod, so as to drive the rail-change baffle to sway.

In a preferred embodiment, the other end of the rail-change baffle extends out from the switch case, and the switch power-driven rod has its one end articulating with the switch case, and its other end articulating with one end of the rail-change baffle positioned outside the switch case;

the switch power-driven rod is provided with a diversion angle feedback device.

In a preferred embodiment, a trigger sensor used to write and read the position of the carrier assembly is arranged on the in-air conveying rail:

In a preferred embodiment, a sort reader used to write and read the sort of the winding packages carried by the carrier assembly is arranged on the in-air conveying rail.

In a preferred embodiment, the carrier assembly includes an outer yarn seated suspending carrier assembly used to convey the outer yarn winding package, one unit of the outer yarn seated suspending carrier assembly is structured in the relation that an articulating connection rod is configured to articulate and connect various units with each other, the articulating connection rod is provided with a suspending wheel assembly, which is suspended inside the rail, the lower part of the articulating connection rod is fixedly connected with an outer yarn suspending frame, which is connected to a disc-shaped outer yarn seat, the outer yarn seat is arranged obliquely, and a columnar structure used to mount the outer yarn winding package is arranged on the outer yarn seat.

In a preferred embodiment, the outer yarn branch rail is positioned on the both sides of the machine frame of the twisting machine, and an outer yarn guiding rail is arranged on the machine frame, and an outer yarn guiding wheel is arranged on the outer yarn seat, when the outer yarn seated suspending carrier assembly moves to the position of the twisting machine, the outer yarn guiding wheel enters the outer yarn guiding rail, and holds up the outer yarn seat of the outer yarn seated suspending carrier assembly to keep it in an incline state;

when an outer yarn carrier assembly runs to the station corresponding to the twisting machine, it constitutes a carriage of the twisting machine, which is used to load the outer yarn winding package for twisting operation.

In a preferred embodiment, the bobbin bases used to place the bobbin are arranged on the both sides of outer yarn seat.

In a preferred embodiment, the carrier assembly includes a hugging suspending device used to convey the inner yarn winding package or a yarn product winding package;

one unit of the hugging suspending device is structured in the relation that an articulating connection rod is configured to articulate and connect various units with each other, the articulating connection rod is provided with a suspending wheel assembly, which is suspended inside the rail, the lower part of the articulating connection rod is connected with a vertical bar, which is connected with a hugging arm, a space used to carry the inner yarn winding package is arranged in the middle of the hugging arm, and an opening is arranged at the bottom of the hugging arm.

In a preferred embodiment, a structure for placing bobbins is arranged on the hugging arm.

In a preferred embodiment, the carrier assembly includes an inner yarn suspending device used to convey the inner yarn winding package, one unit of the inner yarn suspending device is structured in the relation that an articulating connection rod is provided with a suspending wheel assembly, which is suspended inside the rail, the articulating connection rod is configured to articulate and connect a plurality of units with each other, the lower part of the articulating connection rod is connected with a connecting rod, which is connected with a four bar linkage, a draw spring is arranged between two connecting rods approached by the four bar linkage at the bottom, the two connecting rods within the four bar linkage are connected to a first suspending rod and a second suspending rod, respectively, and barbs are arranged on the bottoms of the first suspending rod and the second suspending rod;

the draw spring is configured to direct the first suspending rod and the second suspending rod to part from each other.

In a preferred embodiment, an inner yarn branch rail-lifting section capable of ascending and descending is arranged on the inner yarn branch nil corresponding to the twisting machine, so that the carrier assembly carrying the inner yarn winding package ascends and descends in its entirety.

In a preferred embodiment, the inner yarn branch rail-lifting section is fixedly connected with a lifting rail, a lifter guiding wheel is further arranged on a supporting frame and the machine frame, the lifting rail is slidingly connected with the lifter guiding wheel, a guide limit block is arranged on the inner yarn branch rail of the both sides of the inner yarn branch rail-lifting section, so as to ensure that the inner yarn branch rail-lifting section is aligned with the inner yarn branch rail on the both sides when it rises to the highest position; and there is also a driving device provided, which drives the inner yarn branch rail-lifting section to ascend and descend by means of a transmission mechanism;

there is further a travel sensor provided to detect the ascending and descending distance of the inner yarn branch rail-lifting section.

In a preferred embodiment, the driving device may be a motor, a hydraulic cylinder or an air cylinder connected to a gear rack mechanism.

In a preferred embodiment, a lifting main shaft is arranged on the supporting frame, the lifting main shaft rotationally stands on the supporting frame, a lifter driving motor is further arranged on the supporting frame, the lifter driving motor drives the lifting main shaft to rotate, a winching wheel is further arranged on the lifting main shaft, a winching belt is wound on the winching wheel, the end of the winching belt is connected with the inner yarn branch rail-lifting section, and the winching wheel rotates to drive the inner yarn branch rail-lifting section to ascend and descend.

In a preferred embodiment, a sliding rail is arranged on the machine frame of the twisting machine, a sliding frame is slidingly connected with the sliding rail, a spindle bucket and a twisting mechanism are arranged on the sliding frame, and the sliding frame is configured to carry the spindle bucket and the twisting mechanism to slide out from or into one side of the twisting machine, when the sliding frame slides out from the side, no covering is above the spindle bucket.

In a preferred embodiment, a sliding main shaft is arranged on the machine frame, the sliding main shaft is connected with a driving device by means of a transmission mechanism, a sliding rack is fixedly arranged on the sliding frame, a sliding gear is fixedly arranged on the sliding frame, the sliding gear meshes with the sliding rack, so as to drive the sliding frame to slide out from or into one side of the twisting machine.

In a preferred embodiment, an ascending trolley guiding rail is arranged on the both sides of the twisting machine, there is also an ascending trolley provided, the bottom of which is provided with a ground wheel, and one side of which is provided with a footstep, a guiding pulley mechanism is arranged on the ascending trolley, and the guiding pulley mechanism is slidingly connected with the ascending trolley guiding rail.

In a preferred embodiment, a donning area is further arranged in the outer yarn preparation area or the inner yarn preparation area, a mechanical arm is arranged in the donning area, the mechanical arm is provided with a multi-claw manipulator;

a roller path is arranged around the mechanical arm.

In a preferred embodiment, a bobbin supplying unit used to supply a bobbin of a yarn product winding package is further arranged on the donning area;

In a preferred embodiment, the bobbin supplying unit includes a bobbin elevating belt, a bobbin translating belt, a bobbin encircling belt and a jacking unit;

the bobbin elevating belt is arranged obliquely, so as to convey the bobbin from a low position to the bobbin translating belt at a high position;

the bobbin translating belt is positioned in the middle of the bobbin encircling belt, and the axis of the bobbin is arranged in the direction of movement of the bobbin translating belt on the bobbin translating belt;

a plurality of overturning buckets used to carry the bobbin are arranged on the bobbin encircling belt, and the bobbin translating belt is used to convey the bobbin into the overturning bucket;

the bobbin encircling belt has an altitude equal to the carrier assembly, the bobbin encircling belt is provided with a station aligned with the carrier assembly, and a jacking unit is arranged near the station, and the jacking unit is used to overturn the bobbin within the overturning bucket onto a bobbin base of an inner yarn carrier assembly.

For the whole-process automatic loading-and-unloading and logistics system according to the present disclosure, the forementioned structure enables the outer yarn winding package, the inner yarn winding package and the yarn product winding package to be delivered high-efficiently in large scale by suspending and conveying, so as to largely reduce the labor intensity of operators and dramatically improve production efficiency. For a 40-meter-long straight twisting machine taken as an example, it needs to take about 20 minutes to don yarn by an AVG robot, but by means of the solution according to the present disclosure, it takes only about 7 minutes to send and don yarn to the straight twisting machine. Compared with the solution adopting an AVG robot to don yarn, the donning efficiency of the present disclosure is about 20/7≈3=285.7%, that is, the efficiency rises by more than 280%.

BRIEF DESCRIPTION OF THE DRAWINGS

We shall further describe the present disclosure in combination with the drawings and examples as follows.

FIG. 3 shows a structure view of the donning area and the bobbin supplying unit according to the present disclosure.

Figure 1:
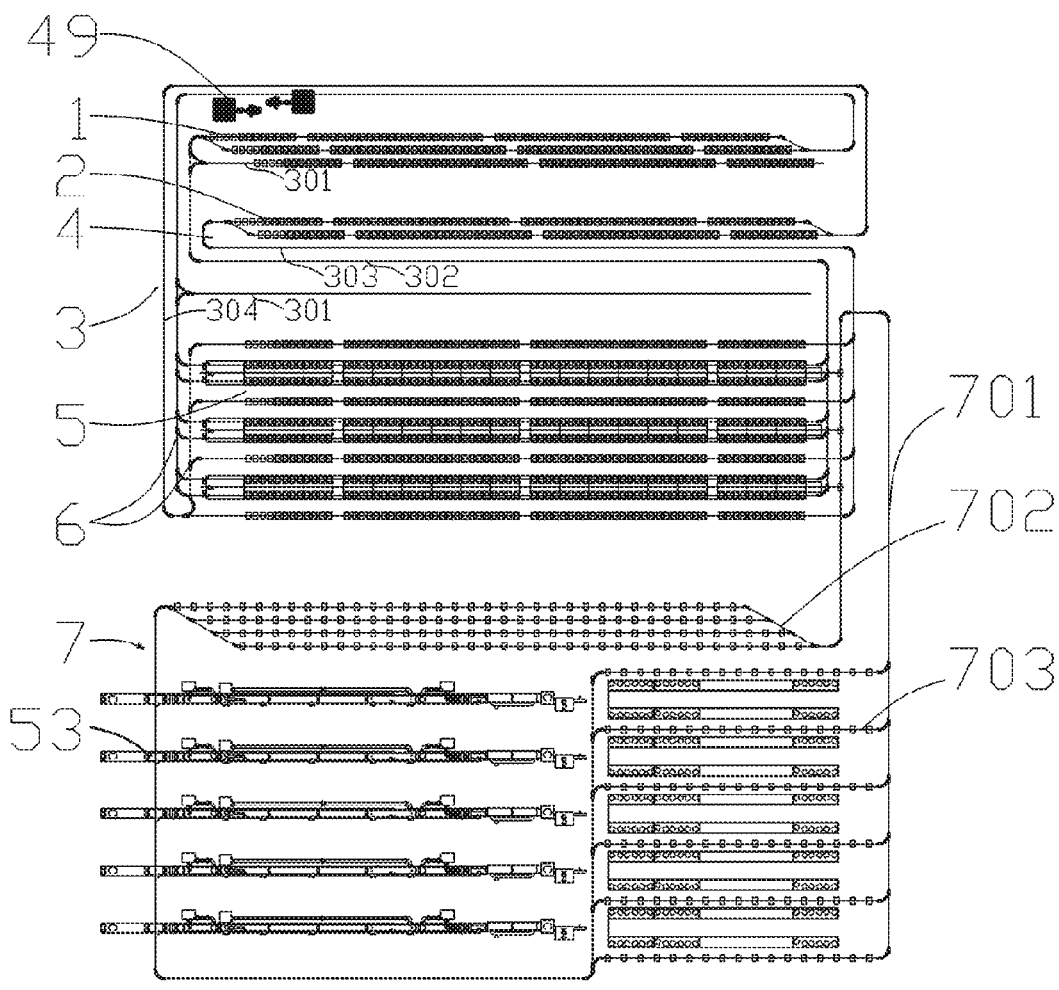
FIG. 1 shows a top view of the overall structure of the present disclosure.

Wherein, outer yarn preparation area 1, inner yarn preparation area 2, in-air conveying rail 3, camera-backing rail 301, out yarn main rail 302, inner yarn main rail 303, yarn product rail 304, inner cavity 305, original yarn delivery area 4, twisting area 5, diverging-and-merging switch 6, rail-change baffle 601, free end 6011, switch case 602, switch pin shaft 603, baffle extension 604, switch power-driven rod 605, diversion angle feedback device 606, weaving area 7, yarn product main rail 701, yarn product buffering rail 702, yarn product donning rail 703, twisting machine 8, fixed frame 9, machine frame 10, carriage 11, outer yarn branch rail 12, inner yarn branch rail 13, inner yarn branch rail-lifting section 131, inner yarn branch rail-lifting section 131, yarn shelving plate 14, tube seat 15, small-diameter outer yarn winding package 16, ascending trolley 17, ground wheel 171, footstep 172, spindle bucket 18, ascending trolley guiding rail 19, guide pulley mechanism 20, inner yarn suspending device 21, connecting rod 211, four bar linkage 212, draw spring 213, first suspending rod 214, second suspending rod 215, barbs 216, first connecting rod 2121, second connecting rod 2122, travel driving unit 22, trigger sensor 23, brake 24, outer yarn carrier assembly 25, twisting mechanism 26, rotating swing arm 27, sort reader 28, sliding rack 29, sliding gear 30, sliding main shaft 31, transmission mechanism 32, driving device 33, sliding rail 34, sliding frame 35, supporting frame 36, beam 37, lifting rail 38, lifter guiding wheel 39, lifter driving motor 40, lifting main shaft 41, winching wheel 42, winching belt 43, travel sensor 44, inner yarn hugging suspending device 45, suspending wheel assembly 451, articulating connection rod 452, vertical bar 453, outer yarn suspending base 454, hugging arm 455, opening 4551, ball head 456, opening groove 457, outer yarn seated suspending carrier assembly 46, outer yarn suspending frames 461, outer yarn seat 462, columnar structure 4621, bobbin bases 463, outer yarn winding package 47, inner yarn winding package 48, donning area 49, forklift truck 491, tray 492, roller path 493, multi-claw manipulator 494, mechanical arm 495, driving device 400, transmission mechanism 401, empty bobbin 51, bobbin supplying unit 52, bobbin elevating belt 521, bobbin translating belt 522, bobbin encircling belt 523, jacking unit 524, overturning bucket 525, weaving machine 53, yarn product winding package 54, guide limit block 132

DETAILED DESCRIPTION OF SOME EMBODIMENTS

Example 1

As shown in FIG. 1, a whole-process automatic loading-and-unloading and logistics system includes the outer yarn preparation area 1, the inner yarn preparation area 2, the weaving area 7 and the in-air conveying rail 3.

In the outer yarn preparation area 1, the carrier assembly 25 delivers the outer yarn winding package 47 to the outer yarn branch rail 12 of the twisting machine 8 in the twisting area 5 via the out yarn main rail 302 of the in-air conveying rail 3.

In the inner yarn preparation area 2, the carrier assembly 25 delivers the inner yarn winding package 48 to the inner yarn branch rail 13 of the twisting machine 8 in the twisting area 5 via the inner yarn main rail 303 of the in-air conveying rail 3.

In the twisting area 5, the carrier assembly 25 delivers the yarn product to the yarn product donning rail 703 in the weaving area 7 via the yarn product main rail 701 of the in-air conveying rail 3. This structure enables the yarn winding package to be quickly delivered to the twisting area 5 and the weaving area 7 via the in-air conveying rail 3. As calculated, the efficiency of the present disclosure is more than 400% times higher than that of the solution adopting an AVG robot to don yarn in the condition of the same investment scale and the achievement to the identical donning operation.

Figure 2:
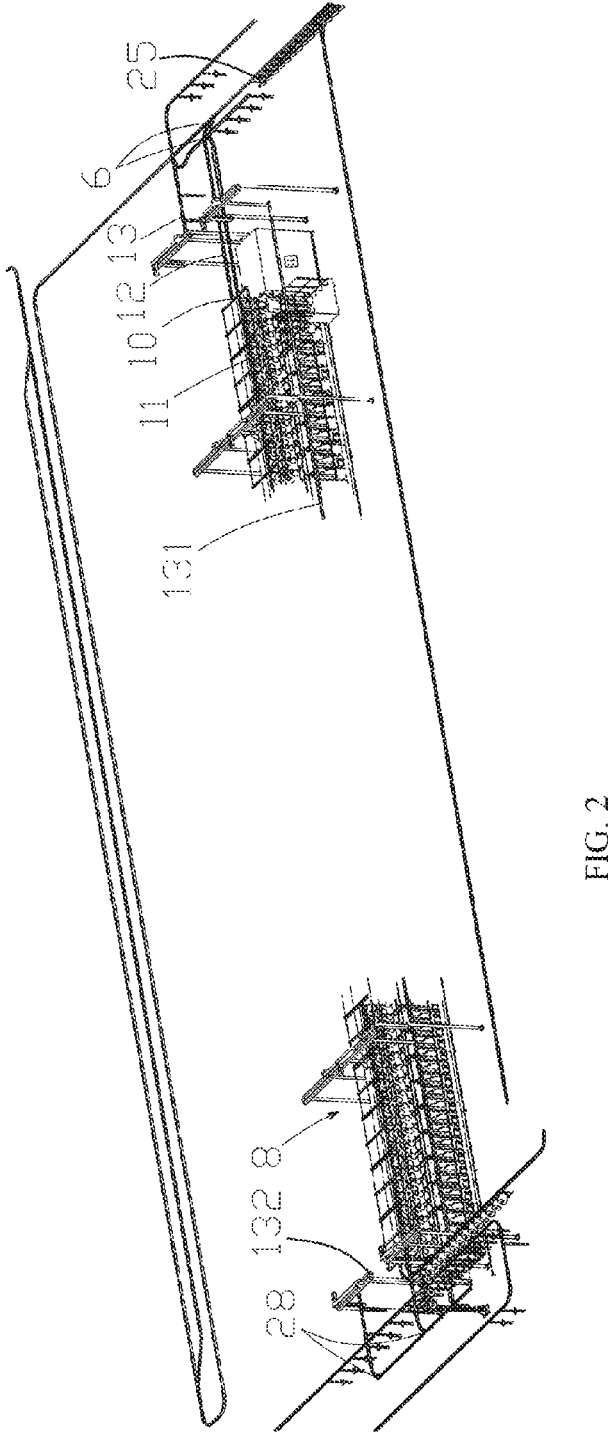
FIG. 2 shows a local structure view of the twisting area according to the present disclosure.
Figure 3:
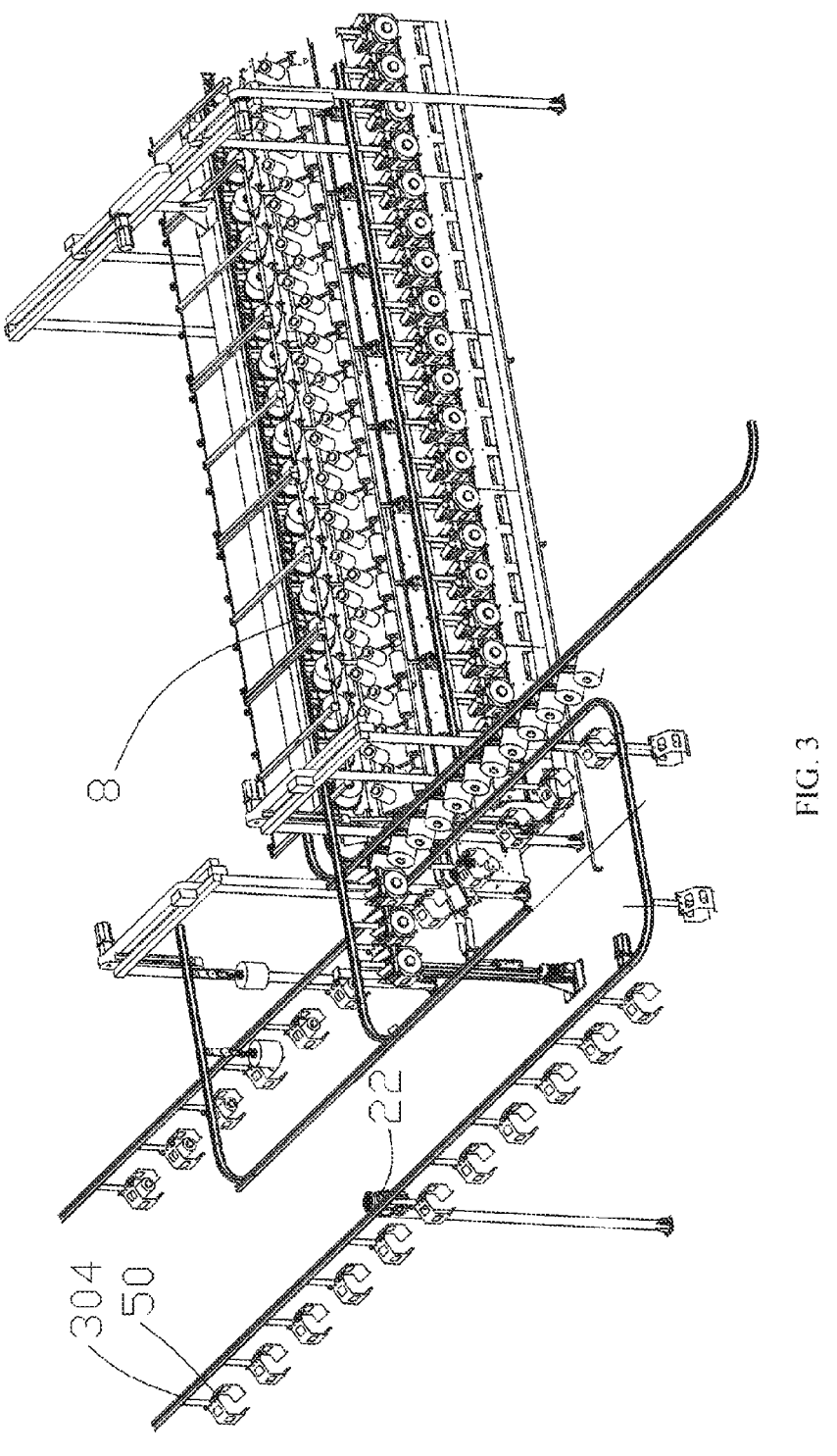
FIG. 3 shows a local structure view of the twisting area according to the present disclosure.
Figure 6:
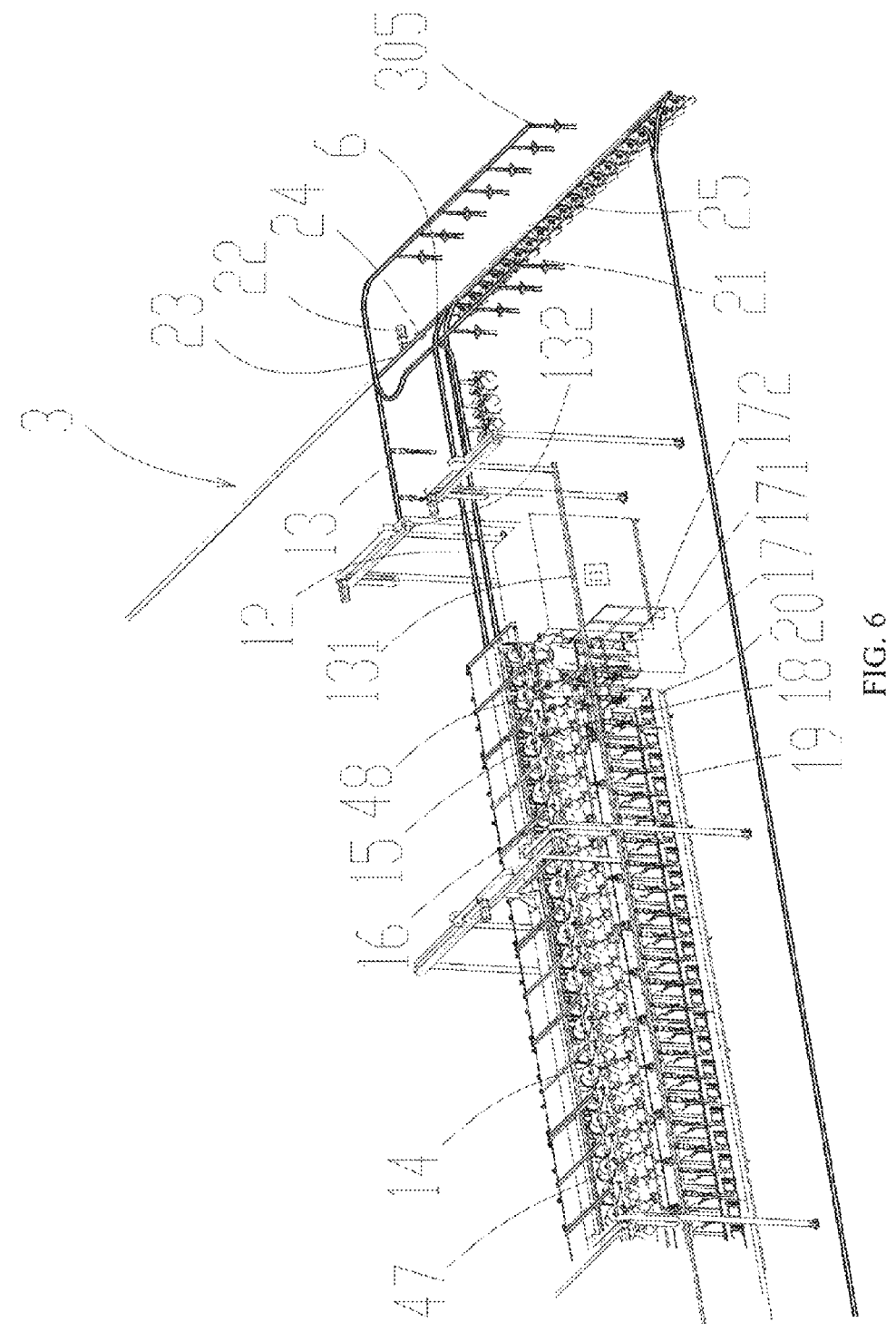
FIG. 6 shows a structure view of the inner yarn branch rail and the outer yarn branch rail according to the present disclosure.

As a preferred solution shown in FIGS. 2, 3 and 6, the carrier assembly 25 is formed by articulating and connecting a plurality of independent units, the number of the independent units of the carrier assembly 25 corresponds to the number of the operation stations of the twisting machine 8 in the twisting area 5, or the number of the independent units corresponds to the number of the operation stations of the weaving machine 53 in the weaving area 7.

In FIG. 6, the carrier assembly 25 is driven to travel by the travel driving unit 22 fixed on the in-air conveying rail 3. Under the function of the connection formed between the friction wheel and the motor fixed on the in-air conveying rail 3, and the friction generated between the friction wheel and the articulating connection rod 452 in the carrier assembly 25, the travel driving unit 22 drives the entire carrier assembly 25 to travel.

As a preferred solution shown in FIG. 1, the carrier-backing rail 301 is further arranged on the in-air conveying rail 3, and has its one end connected to the in-air conveying rail 3 and its other end free of rails. The resultant structure enables avoidance of other carrier assemblies 25, or the reversal operation of the carrier assembly 25, for example, reversing the orientation of the outer yarn seat 462 in the outer yarn seated suspending carrier assembly 46.

As a preferred solution shown in FIG. 1, the yarn product buffering rail 702, which is a parallel multi-row rail, is further arranged on the in-air conveying rail 3, and has its both ends connected to the yarn product main rail 701. The resultant structure enables the yarn product buffering rail 702 to be well adapted for the production rhythm between the twisting machine 8 and the weaving machine 53.

As a preferred solution shown in FGs. 1, 2, 3, 6 and 16, the diverging-and-merging switches 6 are arranged at many positions of the in-air conveying rail 3, enabling the reversal and connection of different rails.

Figure 12:
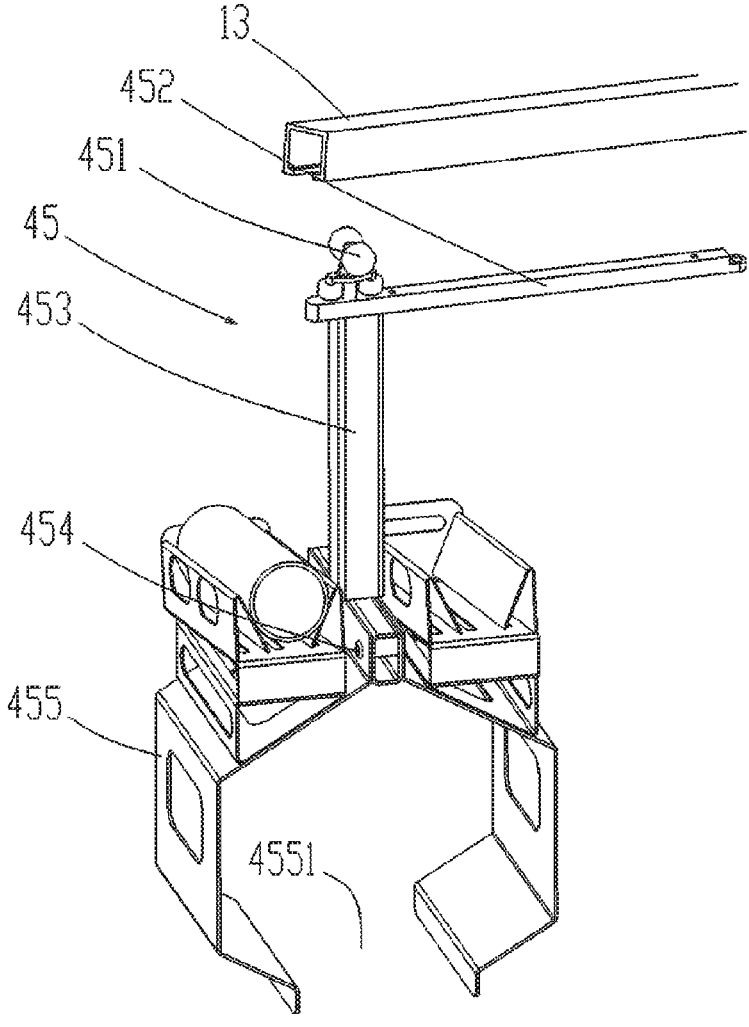
FIG. 12 shows a structure view of the hugging suspending device according to the present disclosure.
Figure 13:
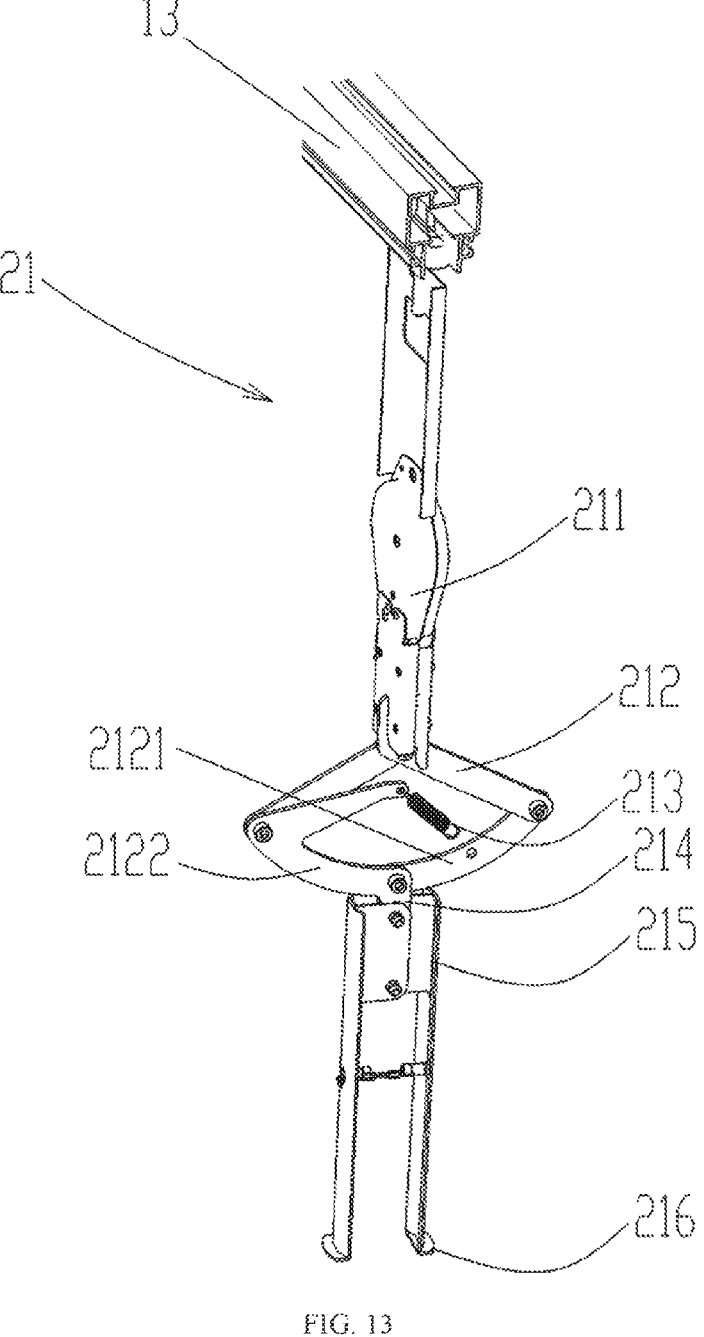
FIG. 13 shows a structure view of the inner yarn suspending device according to the present disclosure.
Figure 14:
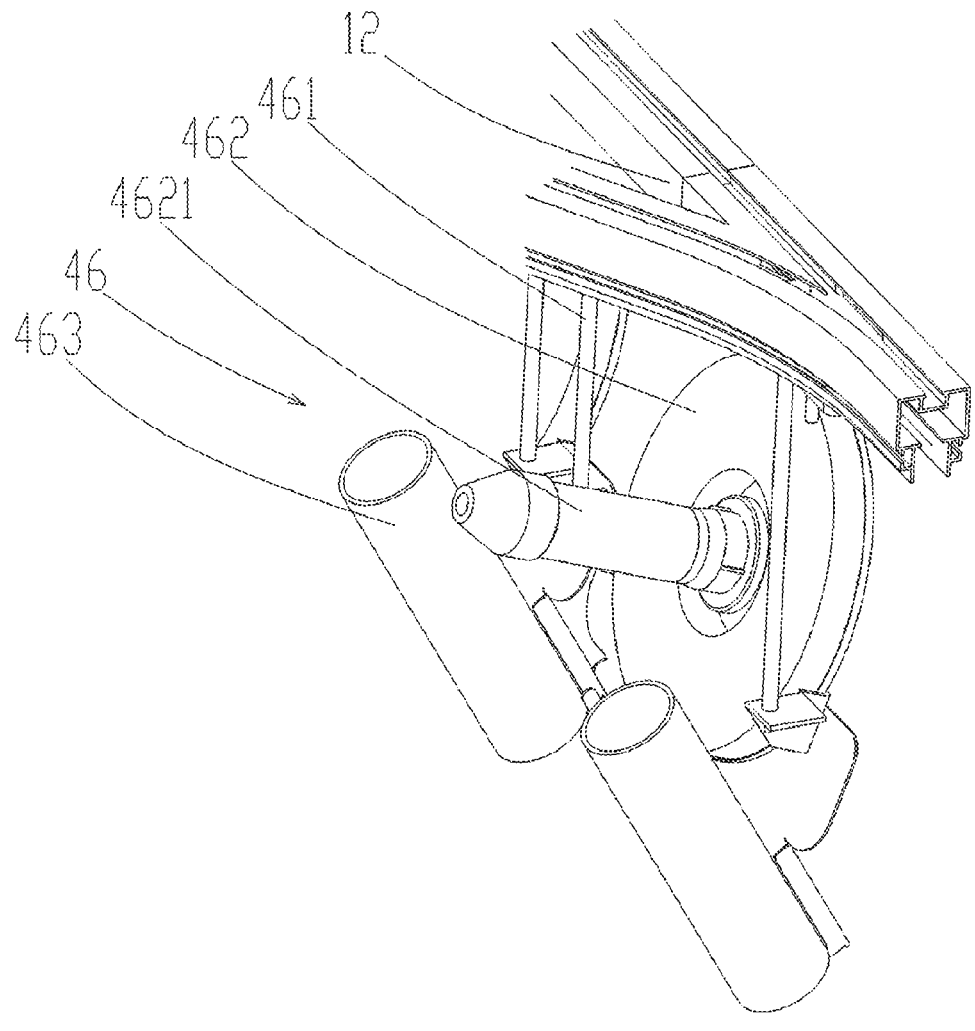
FIG. 14 shows a structure view of the outer yarn seated suspending carrier assembly according to the present disclosure.

As a preferred solution shown in FIGS. 12-14, the in-air conveying rail 3 is provided with the inner cavity 305, which receives the movement parts of the carrier assembly 25, such as a suspending wheel assembly 451.

Figure 16:
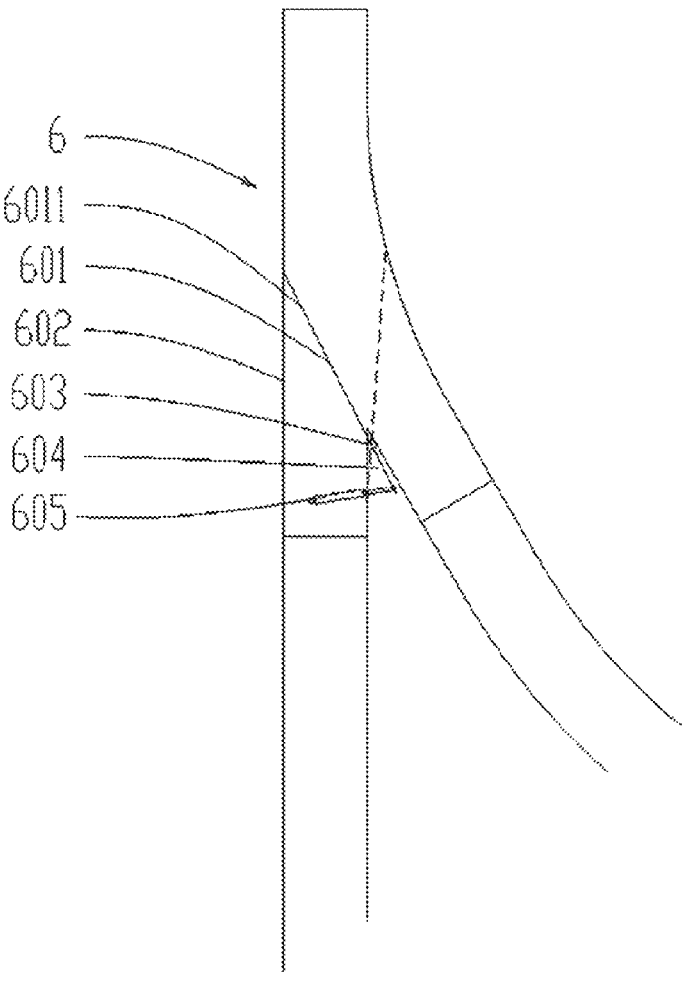
FIG. 16 shows a structure view of the diverging-and-merging switch according to the present disclosure.
Figure 17:
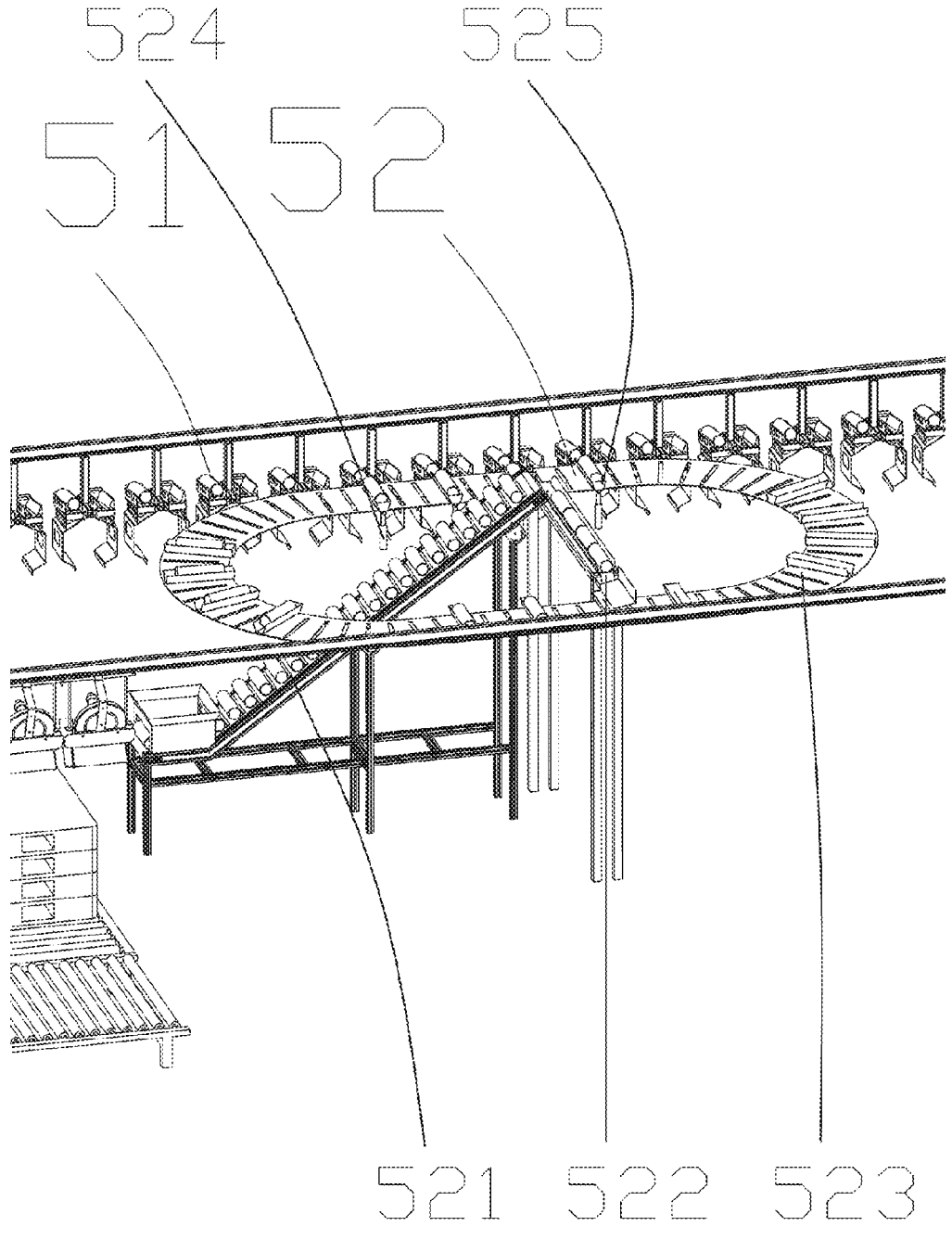
FIG. 17 shows a structure of the bobbin supplying unit 52.
Figure 18:
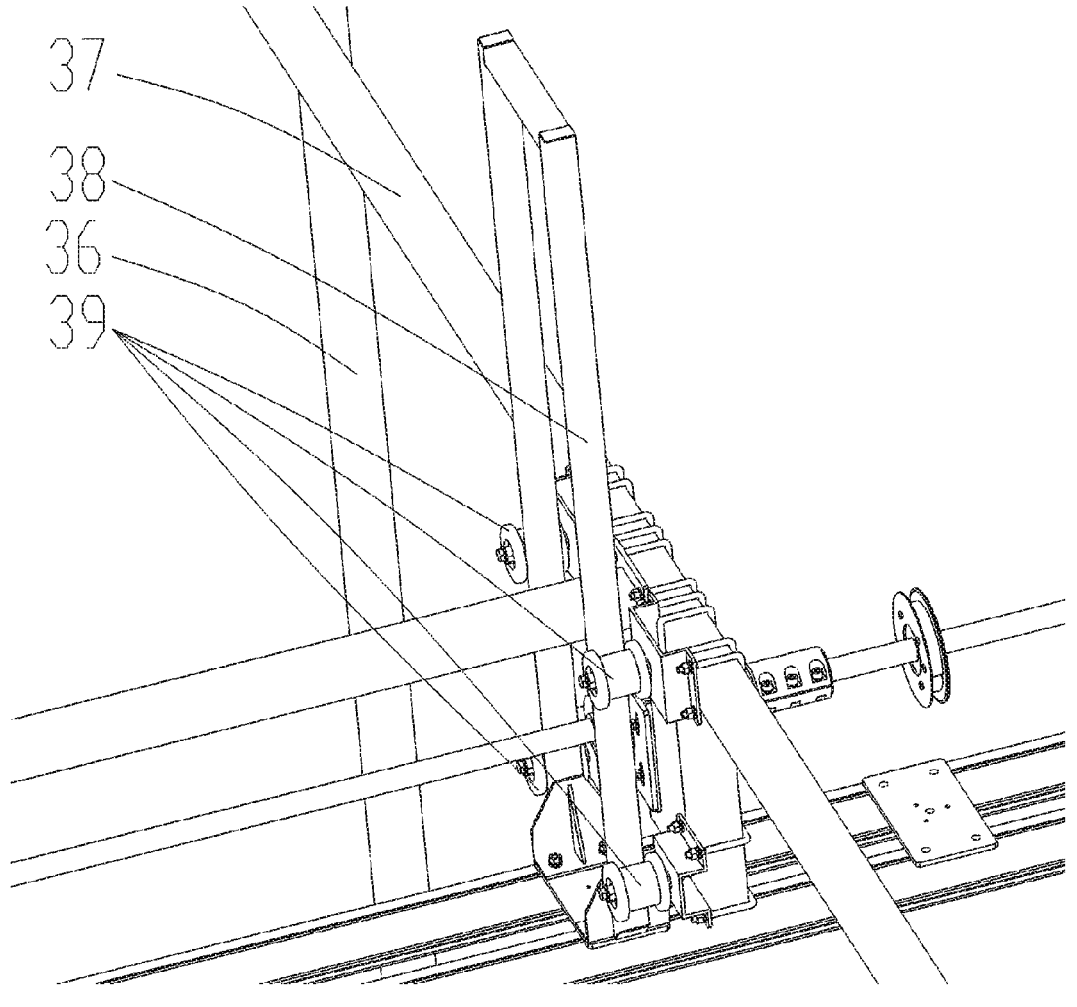
FIG. 18 shows a connection manner of the lifting rail 38 and the lifter guiding wheel 39.

As a preferred solution shown in FIG. 16, the diverging-and-merging switch 6 is structured in the relation that the switch pin shaft 603 is vertically arranged at the position where the switch case 602 of the diverging-and-merging switch 6 forks, and the vertical rail-change baffle 601 is connected to the switch pin shaft 603 and capable of swaying, the rail-change baffle 601 has its one end positioned in the cavity of the switch case 602, and its free end 6011 extending from two rails to one rail and capable of covering either of the two rails, so that the carrier assembly 25 enters another rail, ending with a rail's switch.

The rail-change baffle 601 is further connected with the switch power-driven rod 605, so as to drive the rail-change baffle 601 to sway. In an optional solution, it is deemed as an equivalent replacement that the switch power-driven rod 605 may also be replaced with a cylinder. The advantage of using the switch power-driven rod 605 is that there is no need to set up a complex air circuit.

As a preferred solution shown in FIG. 16, the other end of the rail-change baffle 601 extends out from the switch case 602, and the switch power-driven rod 605 has its one end articulating with the switch case 602, and its other end articulating with one end of the rail-change baffle 601 positioned outside the switch case 602.

The switch power-driven rod 605 is provided with the diversion angle feedback device 606. The diversion angle feedback device 606 is a feedback device that finally feedbacks the angular position of the rail-change baffle 601, for example, a Hall sensor arranged inside the switch power-driven rod 605, or an angle encoder arranged coaxially with the switch pin shaft 603.

As a preferred solution shown in FIG. 6, the trigger sensor 23 used to write and read the position of the carrier assembly 23 is arranged on the in-air conveying rail 3, for example, a limit switch, a photoelectric sensor or a laser code scanner. The trigger sensor 23 is combined with the diverging-and-merging switch 6, for convenience to enable the automatic control of the diverging-and-merging switch 6.

As a preferred solution shown in FIG. 2, the sort reader 28 used to write and read the sort of the winding packages carried by the carrier assembly 25 is further arranged on the in-air conveying rail 3. The resultant structure is for convenience to realize intelligent control, for example, after reading the specific sort of the winding packages carried by the carrier assembly 25, a control system, such as an IPC on site, can intelligently modify the parameters of twisting machine 8 and the weaving machine 53 according to the sort of yarn, so as to achieve intelligent control, and further avoid human operation errors.

As a preferred solution shown in FIGS. 2, 3, 6 and 14, the carrier assembly 25 includes the outer yarn seated suspending carrier assembly 46 used to convey the outer yarn winding package 47. One unit of the outer yarn seated suspending caner assembly 46 is structured in the relation that the articulating connection rod 452 is configured to articulate and connect the various units with each other, the articulating connection rod 452 is provided with the suspending wheel assembly 451, which is suspended in the rail, the lower part of the articulating connection rod 452 is fixedly connected with the outer yarn suspending frame 461, which is connected to the disc-shaped outer yarn seat 462, the outer yarn seat 462 is arranged obliquely, and the columnar structure 4621 used to mount the outer yarn winding package 47 is arranged on the outer yarn seat 462.

Figure 10:
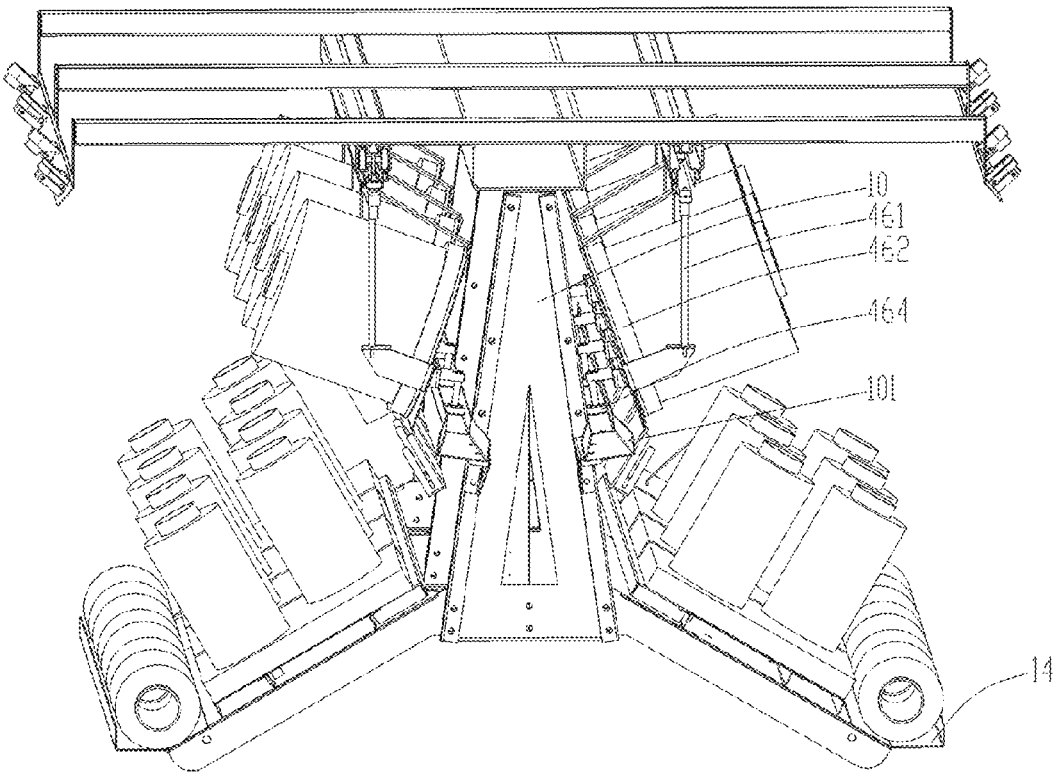
FIG. 10 shows a local structure view of the outer yarn seated suspending carrier assembly according to the present disclosure.

As a preferred solution shown in FIG. 10 and FIG. 14, the outer yarn branch rail 12 is positioned on both sides of the machine frame 10 of the twisting machine 8, the outer yarn guiding rail 101 is arranged on the machine frame 10, and the outer yarn guiding wheel 464 is arranged on the outer yarn seat 462. When the outer yarn seated suspending carrier assembly 46 moves to the position of the twisting machine 8, the outer yarn guiding wheel 464 enters the outer yarn guiding rail 101, and holds up the outer yarn seat 462 of the outer yarn seated suspending carrier assembly 46 to keep it in an incline state.

When the outer yarn carrier assembly 25 runs to the station corresponding to the twisting machine 8, it constitutes the carriage 11 of the twisting machine 8, which is used to load the outer yarn winding package 47 for twisting operation. There is also the yarn shelving plate 14 on the twisting machine 8. The machine frame 10 is further provided with the fixed mounting 9, and the fixed mounting 9 is provided with a plurality of the tube seats 15, which are used to place small-diameter outer yarn winding package 16 used as outer yarn.

As a preferred solution shown in FIG. 14, the bobbin bases 463 used to place the bobbin 51 are arranged on the both sides of outer yarn seat 462.

As a preferred solution shown in FIGS. 2, 3, 6 and 12, the carrier assembly 25 includes the hugging suspending device 45 used to convey the inner yarn winding package 48 or the yarn product winding package 54.

As a preferred solution shown in FIG. 12, one unit of the hugging suspending device 45 is structured in the relation that the articulating connection rod 452 is configured to articulate and connect the various units with each other, the articulating connection rod 452 is provided with the suspending wheel assembly 451, which is suspended in the rail, the lower part of the articulating connection rod 432 is connected with the vertical bar 453, which is connected with the hugging arm 455, a space used to carry the inner yarn winding package 48 is arranged in the middle of the hugging arm 45, and the opening 4551 is arranged at the bottom of the hugging arm 455. This structure is for convenience to convey the inner yarn winding package 48 or the yarn product winding package 54 and hold up the inner yarn winding package 48 or the yarn product winding package 54 from the opening 4551 during operator's handling, that s, easily remove the winding package.

As a preferred solution shown in FIG. 12, a structure for placing bobbins is arranged on the hugging arm 455, which is used to convey bobbins.

As a preferred solution shown in FIGS. 2, 3, 6, 13 and 15, the carrier assembly 25 includes the inner yarn suspending device 21 used to convey the inner yarn winding package 48. One unit of the inner yarn suspending device 21 is structured in the relation that, as shown in FIG. 13, the articulating connection rod 452 is provided with the suspending wheel assembly 451, which is suspended in the rail, the articulating connection rod 452 is configured to articulate and connect a plurality of units with each other, the lower part of the articulating connection rod 452 is connected with the connecting rod 211, which is connected with the four bar linkage 212, the draw spring 213 is arranged between the two connecting rods 2121, 2122 approached by the four bar linkage 212 at the bottom, that is, the draw spring 213 is arranged between the first connecting rod 2121 and the second connecting rod 2122, the two connecting rods 2121, 2122 within the four bar linkage 212 are connected to the first suspending rod 214 and the second suspending rod 215, respectively, the barbs 216 are arranged on the bottoms of the first suspending rod 214 and the second suspending rod 215.

The draw spring 213 is configured to direct the first suspending rod 214 and the second suspending rod 215 to part from each other, so as to hook the bobbin of the inner yarn winding package. The pressure on the four bar linkage 212 overcoming the tensile force of the draw spring 213 enables the first suspending rod 214 and the second suspending rod 215 to approach each other, then releases the bobbin of the inner yarn winding package 48, so as to realize unloading yarn from the inner yarn winding package 48 to the spindle bucket 18.

Figure 11:
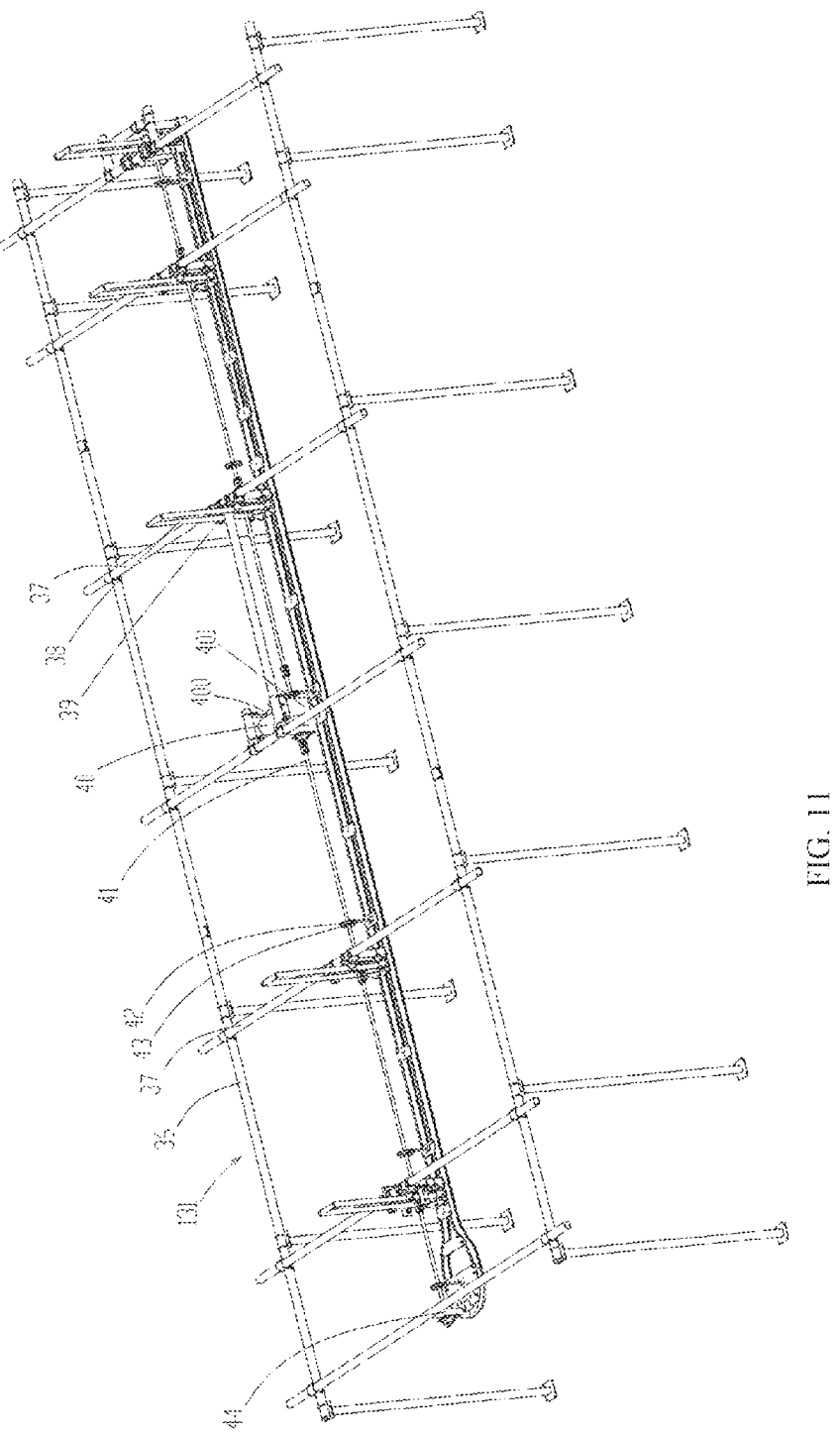
FIG. 11 shows a structure view of the inner yarn branch rad-lifting section according to the present disclosure.
Figure 15:
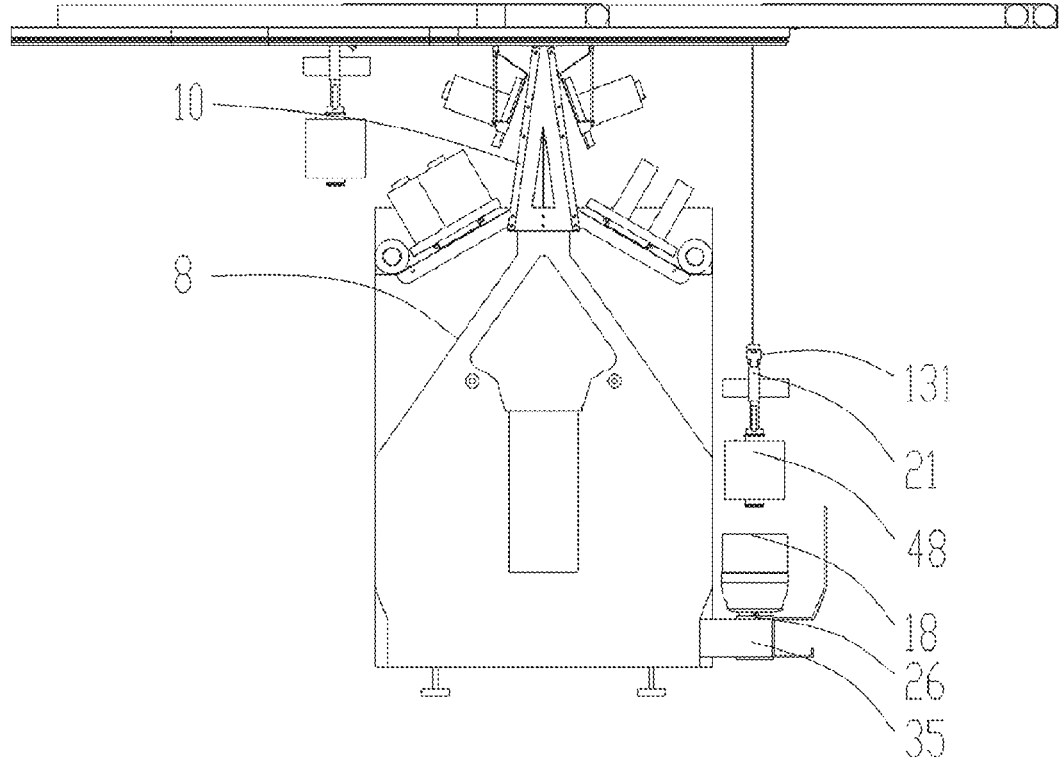
FIG. 15 shows a side view of the inner yarn branch rail-lifting section according to the present disclosure.

As a preferred solution shown in FIGS. 2, 11 and 15, the inner yarn branch rail-lifting section 131 capable of ascending and descending is arranged on the inner yarn branch rail 13 corresponding to the twisting machine 8, so that the carrier assembly 25 delivering the inner yarn winding package 48 ascends and descends in its entirety. This structure enables further reduction in the carry distance of operators and avoidance of the local muscle damage for operators due to the mechanical labor during carrying. This is particularly effective for mass winding packages of certain industrial yarn, cord or carpet silk.

As a preferred solution shown in FIG. 11, the inner yarn branch rail-lifting section 131 is fixedly connected with the lifting rail 38, the lifter guiding wheel 39 is arranged on the supporting frame 36, the lifting rail 38 is slidingly connected with the lifter guiding wheel 39, and there is also the driving device 400 provided, which drives the inner yarn branch rail-lifting section 131 to ascend and descend by means of the transmission mechanism 401.

There is also the travel sensor 44 provided to detect the ascending and descending distance of the inner yarn branch rail-lifting section 131. The travel sensor 44 may be a contact switch or a photoelectric switch, etc.

In a preferred solution, the driving device may be a motor, a hydraulic cylinder or an air cylinder connected to a gear rack mechanism.

As a preferred solution shown in FIG. 11, the lifting main shaft 41 is arranged on the supporting frame 36, the lifting main shaft 41 rotationally stands on the supporting frame 36, the lifter driving motor 40 is further arranged on the supporting frame 36, the lifter driving motor 40 drives the lifting main shaft 41 to rotate, the winching wheel 42 is further arranged on the lifting main shaft 41, the winching belt 43 is wound on the winching wheel 42, the end of the winching belt 43 is connected with the inner yarn branch rail-lifting section 131, and the winching wheel 42 rotates to drive the inner yarn branch rail-lifting section 131 to ascend and descend. This structure particularly adapts to the application scenario of the present disclosure with capability to reach an ascending and descending distance more than 12 m, and enables the entire inner yarn branch rail 13 not to interfere with the operator's operation before its descending.

Figure 7:
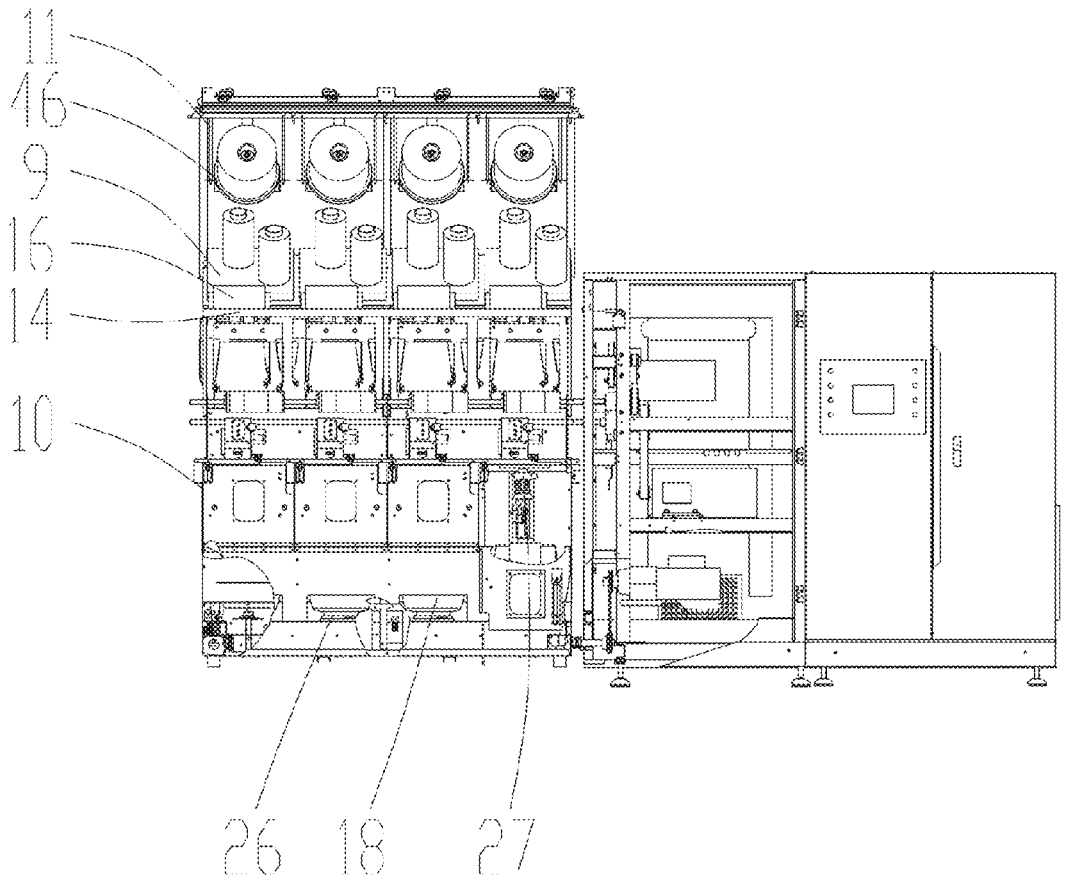
FIG. 7 shows a local structure view of the twisting machine according to the present disclosure.
Figure 8:
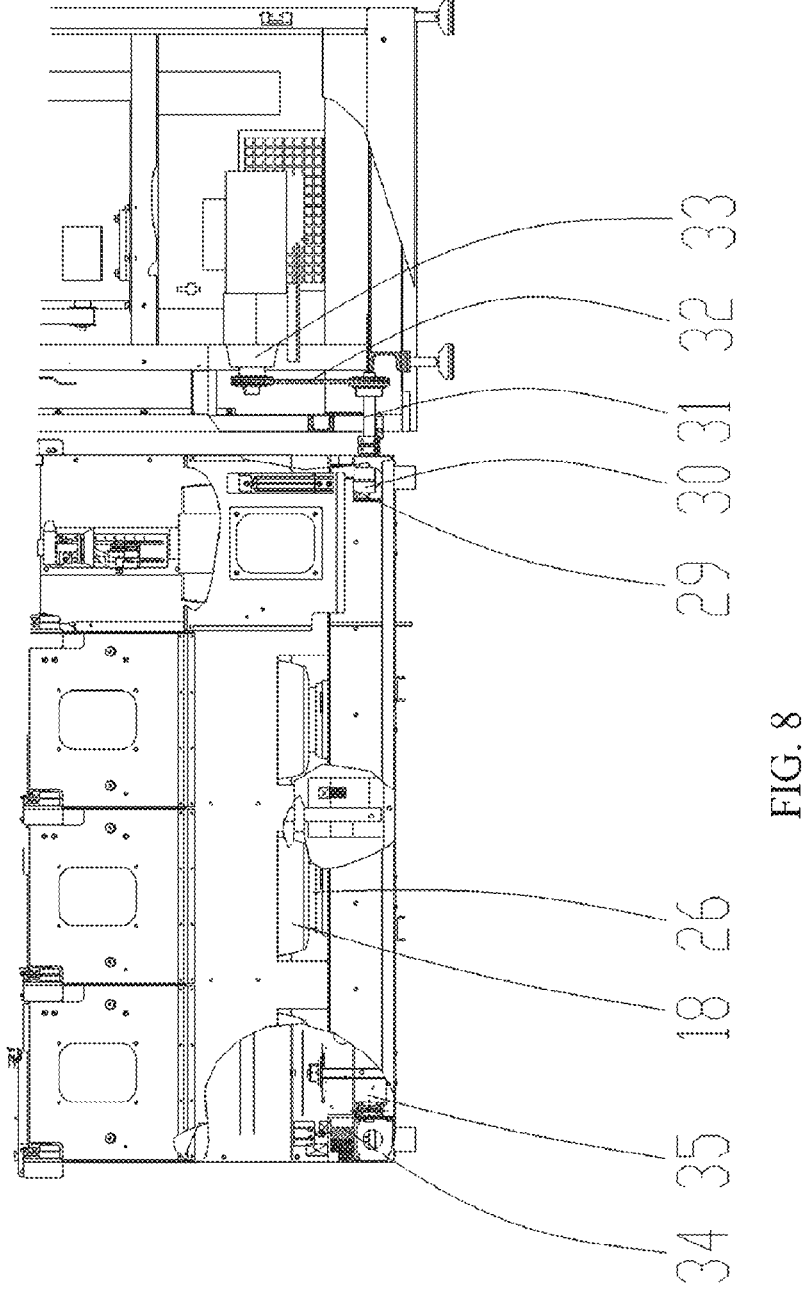
FIG. 8 is show a front structure view of the sliding frame of the twisting machine according the present disclosure.
Figure 9:
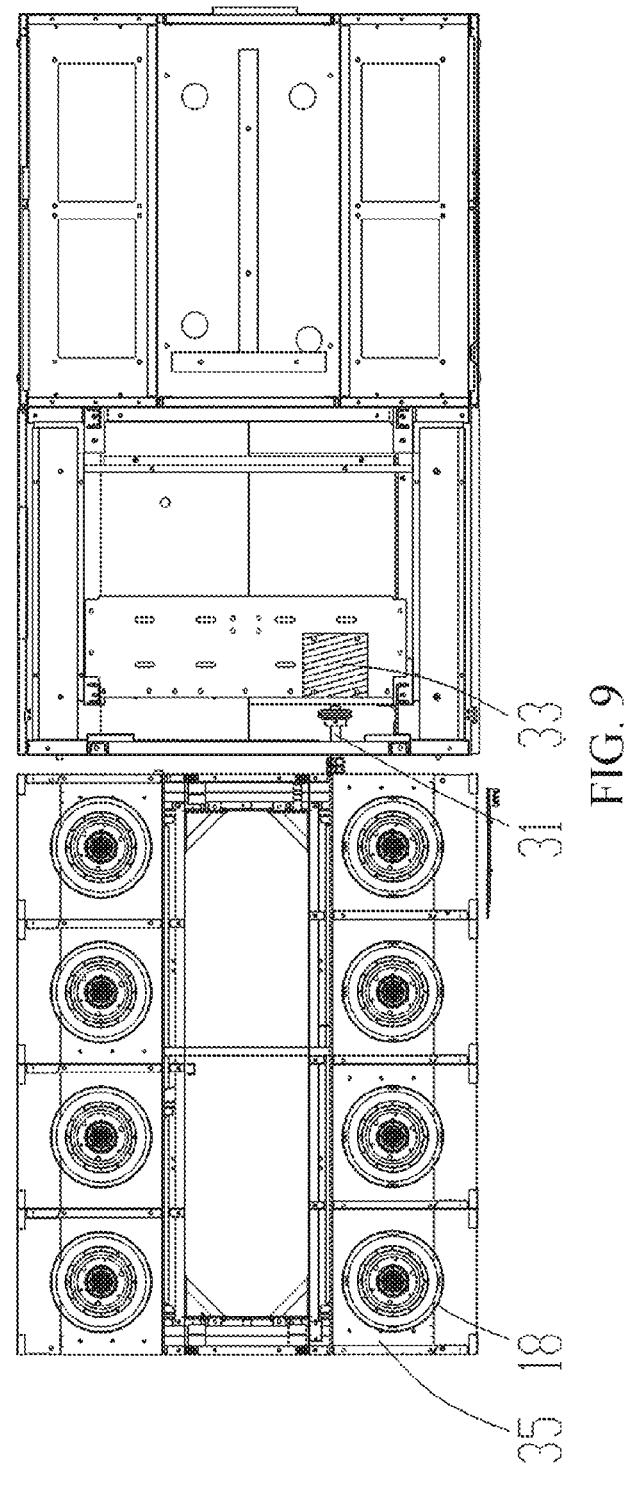
FIG. 9 is show a top structure view of the sliding frame of the twisting machine according the present disclosure.

As a preferred solution shown in FIGS. 7 and 8, the sliding rail 34 is arranged on the machine frame 10 of the twisting machine 8, the sliding frame 35 is slidingly connected with the sliding rail 34, the spindle bucket 18 and the twisting mechanism 26 are arranged on the sliding frame 35, and the sliding frame 35 is configured to carry the spindle bucket 18 and the twisting mechanism 26 and slide out from or into one side of the twisting machine 8. When the sliding frame 35 slides out from the side, no covering is above the spindle bucket 18. The twisting mechanism 26 includes an electric spindling assembly, a twisting disk and other components.

There is still another solution for the spindle bucket 18 to load the inner yarn winding package 48, that is, the rotary swaying arm 27 is arranged on the machine frame 10 above the spindle bucket 18. The twister component is arranged on the free end of the rotary swaying arm 27, so that the rotary swaying arm 27 rotates to dodge the inner yarn winding package 48.

As a preferred solution shown in FIG. 8, the sliding main shaft 31 is arranged on the machine frame, the sliding main shaft 31 is connected with the driving device 33 by means of the transmission mechanism 32, the sliding rack 29 is fixedly arranged on the sliding frame 35, the sliding gear 30 is fixedly arranged on the sliding frame 35, the sliding gear 30 meshes with the sliding rack 29, so as to drive the sliding frame 35 to slide out from or into one side of the twisting machine 8. Preferably, the transmission mechanism 32 is a belt transmission mechanism or a chain transmission mechanism. The driving device 33 is a motor, preferably a servo motor or a stepping motor.

As a preferred solution shown in FIGS. 2 and 6, the ascending trolley guiding rails 19 are arranged on the both sides of the twisting machine 8, there is also the ascending trolley 17 provided, the bottom of which is provided with the ground wheel 171, and one side of which is provided with the footstep 172, the guiding pulley mechanism 20 is arranged on the ascending trolley 17, and the guiding pulley mechanism 20 is slidingly connected with the ascending trolley guiding rail 19.

Figure 4:
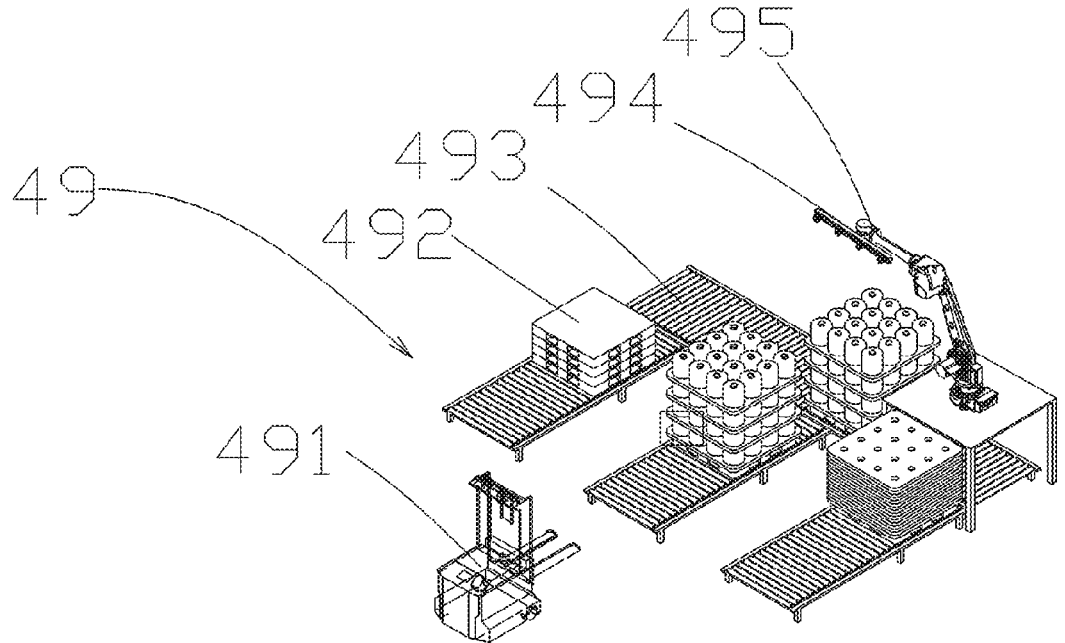
FIG. 4 shows a structure view of the donning area according to the present disclosure.

As a preferred solution shown in FIG. 4, the donning area 49 is further arranged in the outer yarn preparation area 1 or inner yarn preparation area 2, the mechanical arm 495 is arranged in the donning area 49, the mechanical arm 495 is provided with the multi-claw manipulator 494, which is provided with a plurality of enlargeable mechanical claws used to extend into the bobbin, then enlarge itself to grab the winding package, or loosen itself to release the winding package. Preferably, the number of mechanical claws corresponds to the number of the winding packages in each row on the tray 492. This structure enables the multi-jaw manipulator 494 to high-efficiently stack the winding packages on the tray 492 or remove them from the tray 492.

The roller path 493 is arranged around the mechanical arm 495.

Figure 5:
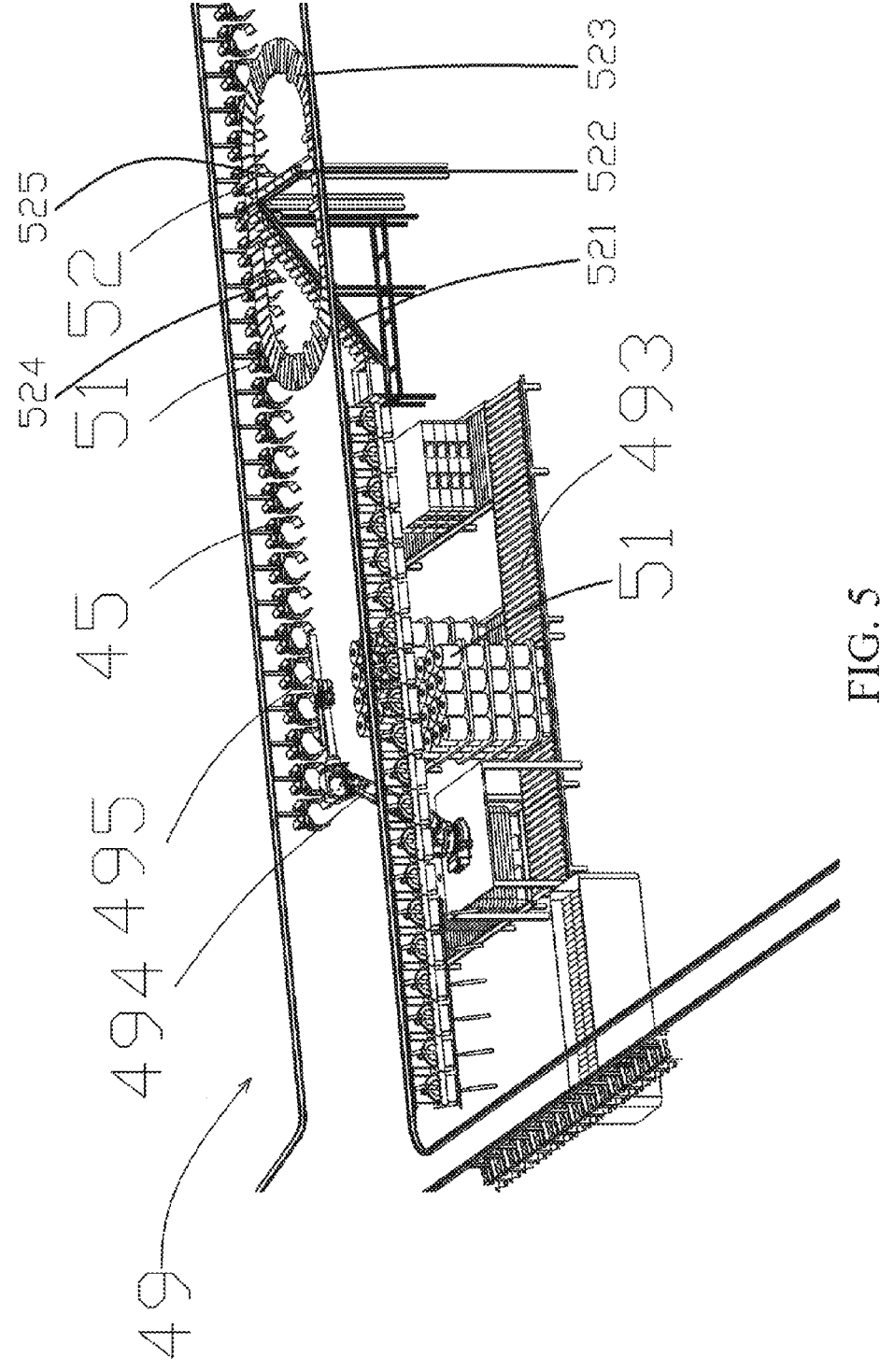

As a preferred solution shown in FIG. 5, the bobbin supplying unit 52 used to supply the bobbin 51 of the yarn product winding package 54 is further arranged on the donning area 49.

As a preferred solution shown in FIG. 5, the bobbin supplying unit 52 includes the bobbin elevating belt 521, the bobbin translating belt 522, the bobbin encircling belt 523 and the jacking unit 524.

The bobbin elevating belt 521 is arranged obliquely, so as to convey the bobbin 51 from a low position to the bobbin translating belt 522 at a high position.

The bobbin translating belt 522 is positioned in the middle of the bobbin encircling belt 523, and the axis of the bobbin 51 is arranged in the direction of movement of the bobbin translating belt 522 on the bobbin translating belt 522.

A plurality of overturning buckets 525 used to carry the bobbin 51 are arranged on the bobbin encircling belt 523, and the bobbin translating belt 522 is used to convey the bobbin 51 into the overturning bucket 525.

The bobbin encircling belt 523 has an altitude equal to the hugging suspending device 45 preferred in the carrier assembly 25, the bobbin encircling belt 523 is provided with the station aligned with the hugging suspending device 45, and the jacking unit 524 is arranged near the station, and the jacking unit is used to overturn the bobbin 51 within the overturning bucket 525 onto the bobbin base 463 of the inner yarn carrier assembly.

Example 2

As shown in FIG. 1, during operation, the inner yarn winding packages 48 and the outer yarn winding packages 47 are first conveyed onto the roller path 493 by the forklift truck 491 in the donning area 49, next taken down by the multi-claw manipulator 494, thus loaded on the outer yarn seated suspending carrier assembly 46 successively arranged and the hugging suspending device 43. The donning operation on the inner yarn suspending device 21 is usually performed by means of the forklift truck 491 and manual work. The inner yarn winding packages 48 and the outer yarn winding packages 47 are conveyed to the twisting area 5 via the in-air conveying rail 3, wherein the outer yarn winding packages 47 enter the outer yarn branch rail 12, and the inner yarn winding packages 48 enter the inner yarn branch rail 13.

The sort reader 28 positioned at the in-air conveying rail 3 reads the sort of the winding packages, and the diverging-and-merging switch 6 conveys the carrier assembly 25 carrying the specified sort of raw yarn to the high position above the specified twisting machine 8 according to the scheduling instructions given by an IPC. There are two outer yarn main rails 302 above one twisting machine 8. The outer yarn seated suspending carrier assembly 46 is fixed by a brake device after its delivery to position, forming the carriage 11. Operators handle the ascending trolley 17 to move along the twisting machine 8, so as to perform donning, doffing and butt-joint operations. The fixed mounting 9 is further arranged on the machine frame 10, and it is configured to place the small-diameter winding package of used outer yarn. Operators remove the yarn cover of the empty bobbin 51, which is left after the outer yarn is exhausted, and then place it on the yarn shelving plate 14, and next place the empty bobbin 51 on the bobbin base 463. After all winding packages on the carriage 11 are used up, the outer yarn seated suspending carrier assembly 46 departs from the outer yarn branch rail 12. The outer yarn seated suspending carrier assembly 46 fully loaded in the outer yarn preparation area 1 departs and comes into the preset outer yarn branch rail 12 under IPC's dispatch, then the outer yarn seated suspending carrier assembly 46 is fixed by the brake device and aligned with the spindle position corresponding to the twisting machine 8.

After the yarn product winding package 54 of twisting machine 8 is full on the bobbin, the yarn product winding package 54 is loaded on the hugging suspending device 45 at the tail of twisting machine 8, and conveyed to the yarn product donning rail 703 via the yarn product main rail 701, next stacked for donning to the weaving machine 53.

At the twisting machine 8 of the twisting area 5, operators turn the rotary swaying arm 27 from the rear to the front of the machine, and then cut off the yarn in the spindle bucket 18, take out a small-diameter winding package therefrom, next place it on the yarn shelving plate 14. After all the spindle buckets 18 are used up, the carrier assembly 25 loaded with the inner yarn winding packages 48 is dispatched to depart from the inner yarn preparation area 2, therefor the carrier assembly 25 may be the hugging suspending device 45 or the inner yarn suspending device 21. The carrier assembly 25 enters the inner yarn branch rail 13. As the twisting machine 8 sends instructions, the driving device 33 acts, with its action the sliding frame 35 slides out from the twisting machine 8. The lifter driving motor 40 of the inner yarn branch rail-lifting section 131 drives the lifting main shaft 41 to rotate, as the winching belt 43 on the winching wheel 42 is released down, the inner yarn branch track lifting section 131 descends, meanwhile the carrier assembly 25 and the inner yarn winding packages 48 on it descend, after the travel sensor 44 detects that the inner yarn branch rail-lifting section 131 has descended to position, they stop. Operators remove the inner yarn winding packages 48 of the hugging suspending device 45 and put them into the spindle buckets 18. Or operators move the inner yarn hanging device 21 to the position above the spindle bucket 18, then press the four bar linkage 212 of the inner yarn hanging device 21, so that the first suspending rod 214 and the second suspending rod 215 retract, and release the inner yarn winding packages 48 into the spindle bucket 18.

After completion of donning for the inner yarn winding packages 48, the inner yarn branch rail-lifting section 131 rises and is aligned with the inner yarn branch rail 13. The empty carrier assembly departs, then operators finish the butt-joint operation for inner yarn.

Operators handle the ascending trolley 17, and put the small-diameter inner yarn winding packages on yarn shelving plate 14 to the tube seat on the fixed mounting, then connect the small-diameter inner and outer yarn winding packages with the outer yarn on the carriage 11 head-to-tail in sequence, next open the corresponding spindle position to start the twisting operation.

The above embodiments are only preferred technical solutions of the present disclosure, and should not be regarded as limiting the present disclosure. The embodiments in the present application and the features in the embodiments can be arbitrarily combined with each other without conflict. The scope of protection of the present disclosure shall be the technical solutions recorded in the claims, including the equivalent alternatives of the technical features in the technical solutions recorded in the claims. Equivalent substitutions and improvements in the scope are also included in the scope of protection of the present disclosure.

What is claimed is:

1. A whole-process automatic loading-and-unloading and logistics system, comprising an outer yarn preparation area (1), an inner yarn preparation area (2), a weaving area (7) and an in-air conveying rail (3), wherein from said outer yarn preparation area (1) an outer yarn winding package (47) is delivered to an outer yarn branch rail (12) of a twisting machine (8) in a twisting area (5) via an out yarn main rail (302) of said in-air conveying rail (3) by one of outer yarn seated suspending carrier assemblies (46) of a carrier assembly (25), from said inner yarn preparation area (2), an inner yarn winding package (48) is delivered to an inner yarn branch rail (13) of the twisting machine (8) in the twisting area (5) via an inner yarn main rail (303) of said in-air conveying rail (3) by one of hugging suspending devices (45) or inner yarn suspending devices (21) of the carrier assembly (25);

wherein, in each one of the outer yarn seated suspending carrier assemblies (46) an articulating connection rod (452) is provided with a suspending wheel assembly (451), which is suspended inside the outer yarn branch rail (12), a lower part of the articulating connection rod (452) is fixedly connected with an outer yarn suspending frame (461), which is connected to a disc-shaped outer yarn seat (462), and a columnar structure (4621) used to mount the outer yarn winding package (47) is arranged on the outer yarn seat (462);

the outer yarn branch rail (12) is positioned on the both sides of the machine frame (10) of the twisting machine (8), and an outer yarn guiding rail (101) is arranged on the machine frame (10), and an outer yarn guiding wheel (464) is arranged on the outer yarn seat (462), when the outer yarn seated suspending carrier assembly (46) moves to a position of the twisting machine (8), the outer yarn guiding wheel (464) enters the outer yarn guiding rail (101), and holds up the outer yarn seat (462) of the outer yarn seated suspending carrier assembly (46) to keep it in an inclined state;

when one of the outer yarn seated suspending carrier assemblies (46) of the outer yarn carrier assembly (25) runs to a workstation corresponding to the twisting machine (8), it constitutes a carriage (11) of the twisting machine (8), which is used to load the outer yarn winding package (47) for twisting operation, wherein, the outer yarn winding package (47) is located outside a spindle bucket (18) of the twisting machine (8), and the inner yarn winding package (48) is located in the spindle bucket (18).

2. The whole-process automatic loading-and-unloading and logistics system according to claim 1, wherein from the twisting area (5), the hugging suspending devices (45) of the carrier assembly (25) deliver yarn products to a yarn product donning rail (703) in said weaving area (7) via a yarn product main rail (701) of said in-air conveying rail (3).

3. The whole-process automatic loading-and-unloading and logistics system according to claim 1, wherein the carrier assembly (25) is driven to travel by a travel driving unit (22) fixed on said in-air conveying rail (3);

a carrier-backing rail (301) is further arranged on said in-air conveying rail (3), and has its one end connected to said in-air conveying rail (3).

4. The whole-process automatic loading-and-unloading and logistics system according to claim 1, wherein a yarn product buffering rail (702), which is a parallel multi-row rail, is further arranged on said in-air conveying rail (3), and has its both ends connected to a yarn product main rail (701).

5. The whole-process automatic loading-and-unloading and logistics system according to claim 1, wherein diverging-and-merging switches (6) are arranged at many positions of said in-air conveying rail (3), enabling a controllable switching between two rails.

6. The whole-process automatic loading-and-unloading and logistics system according to claim 5, wherein said in-air conveying rail (3) is provided with an inner cavity (305), in which a movement part of the carrier assembly (25) runs;

the diverging-and-merging switch (6) is structured in the relation that a switch pin shaft (603) is vertically arranged at the position where a switch case (602) of the diverging-and-merging switch (6) forks, and a vertical rail-change baffle (601) is connected to the switch pin shaft (603) and capable of swaying, the rail-change baffle (601) has its one end positioned in the cavity of the switch case (602);

the rail-change baffle (601) is further connected with a switch power-driven rod (605), so as to drive the rail-change baffle (601) to sway.

7. The whole-process automatic loading-and-unloading and logistics system according to claim 6, wherein an other end of the rail-change baffle (601) extends out from the switch case (602), and the switch power-driven rod (605) has its one end articulating with the switch case (602), and its other end articulating with one end of the rail-change baffle (601) positioned outside the switch case (602);

the switch power-driven rod (605) is provided with a diversion angle feedback device (606).

8. The whole-process automatic loading-and-unloading and logistics system according to claim 1, wherein a trigger sensor (23) used to write and read the position of the carrier assembly (25) is arranged on said in-air conveying rail (3);

a sort reader (28) used to read a type of the winding packages carried by the carrier assembly (25) is arranged on said in-air conveying rail (3).

9. The whole-process automatic loading-and-unloading and logistics system according to claim 1, wherein in each one of the hugging suspending devices (45), a second articulating connection rod (452) is provided with a second suspending wheel assembly (451), which is suspended inside the inner yarn branch rail (13), a lower part of the second articulating connection rod (452) is connected with a vertical bar (453), which is connected with a hugging arm (455), a space used to cany the inner yarn winding package (48) is arranged in a middle of the hugging arm (455), and an opening (4551) is arranged at a bottom of the hugging arm (455).

10. The whole-process automatic loading-and-unloading and logistics system according to claim 1, wherein in each one of the inner yarn suspending devices (21) a third articulating connection rod (452) is provided with a third suspending wheel assembly (451), which is suspended inside the inner yarn branch rail (13), a lower part of the third articulating connection rod (452) is connected with a connecting rod (211), which is connected with a four bar linkage (212), a draw spring (213) is arranged between two connecting rods (2121, 2122) at a bottom, the two connecting rods (2121, 2122) within the four bar linkage (212) are connected to a first suspending rod (214) and a second suspending rod (215), respectively, and barbs (216) are arranged on bottoms of the first suspending rod (214) and the second suspending rod (215);

the draw spring (213) is configured to direct the first suspending rod (214) and the second suspending rod (215) to part from each other.

11. The whole-process automatic loading-and-unloading and logistics system according to claim 1, wherein an inner yarn branch rail-lifting section (131) capable of ascending and descending is arranged on the inner yarn branch rail (13) corresponding to the twisting machine (8), so that the carrier assembly (25) carrying the inner yarn winding package (48) ascends and descends in its entirety.

12. The whole-process automatic loading-and-unloading and logistics system according to claim 11, wherein a beam (37) is fixedly connected with a supporting frame (36) of the inner yarn branch rail-lifting section (131) which is fixedly connected with a lifting rail (38), shafts of four lifter guiding wheels (39) are further connected to the beam (37), the lifting rail (38) is slidingly connected with the four lifter guiding wheels (39) and moving along the four lifter guiding wheels (39), a guide limit block (132) is arranged on the inner yarn branch rail (13) of the both sides of the inner yarn branch rail-lifting section (131), so as to ensure that the inner yarn branch rail-lifting section (131) is aligned with the inner yarn branch rail (13) on the both sides when it rises to the highest position; and there is also a driving device (400) provided, which drives the inner yarn branch rail-lifting section (131) to ascend and descend;

there is further a travel sensor (44) provided to detect the ascending and descending distance of the inner yarn branch rail-lifting section (131).

13. The whole-process automatic loading-and-unloading and logistics system according to claim 12, wherein a lifting main shaft (41) is arranged on the supporting frame (36), the driving device (400) drives the lifting main shaft (41) to rotate, a winching wheel (42) is further arranged on the lifting main shaft (41), a winching belt (43) is wound on the winching wheel (42), the end of the winching belt (43) is connected with the inner yarn branch rail-lifting section (131), and the winching wheel (42) rotates to drive the inner yarn branch rail-lifting section (131) to ascend and descend.

14. The whole-process automatic loading-and-unloading and logistics system according to claim 12, wherein a sliding rail (34) is arranged on the machine frame (10) of the twisting machine (8), a sliding frame (35) is slidingly connected with the sliding rail (34), the spindle bucket (18) and a twisting mechanism (26) are arranged on the sliding frame (35), and the sliding frame (35) is configured to carry the spindle bucket (18) and the twisting mechanism (26) to slide out from or into one side of the twisting machine (8), when the sliding frame (35) slides out from the side, no covering is above the spindle bucket (18).

15. The whole-process automatic loading-and-unloading and logistics system according to claim 14, wherein a sliding main shaft (31) is arranged on the machine frame, the sliding main shaft (31) is connected with a driving device (33) by means of a transmission mechanism (32), a sliding rack (29) is fixedly arranged on the sliding frame (35), a sliding gear (30) is fixedly arranged on the sliding fame (35), the sliding gear (30) meshes with the sliding rack (29), so as to drive the sliding frame (35) to slide out from or into one side of the twisting machine (8).

16. The whole-process automatic loading-and-unloading and logistics system according to claim 1, wherein a donning area (49) is further arranged in said outer yarn preparation area (1) or said inner yarn preparation area (2), a mechanical arm (495) is arranged in the donning area (49), the mechanical arm (495) is provided with a manipulator (494) with multiple claws;

a roller path (493) is arranged around the mechanical arm (495).

* * * * *